(12) United States Patent
Nitta et al.

(10) Patent No.: US 7,628,687 B2
(45) Date of Patent: Dec. 8, 2009

(54) AIR-INLET OPENING/CLOSING UNIT

(75) Inventors: Kiyotaka Nitta, Toyohashi (JP); Akio Hirano, Toyoake (JP); Naohisa Nishimura, Kuwana-gun (JP)

(73) Assignee: DENSO Corporation, Kariya (JP)

( * ) Notice: Subject to any disclaimer, the term of this patent is extended or adjusted under 35 U.S.C. 154(b) by 1026 days.

(21) Appl. No.: 10/980,527

(22) Filed: Nov. 3, 2004

(65) Prior Publication Data

US 2005/0092123 A1   May 5, 2005

(30) Foreign Application Priority Data

Nov. 4, 2003   (JP) ............................. 2003-374688

(51) Int. Cl.
*F24F 13/08* (2006.01)
*F16L 7/00* (2006.01)
(52) U.S. Cl. ....................... 454/339; 137/375
(58) Field of Classification Search .......... 454/339, 454/369; 137/375
See application file for complete search history.

(56) References Cited

U.S. PATENT DOCUMENTS 2,966,169 A * 12/1960 Reece .................... 137/375
5,382,192 A * 1/1995 Hoffman .................... 454/61
5,728,001 A * 3/1998 Attridge, Jr. ............. 454/369
6,354,169 B1 3/2002 Toyoshima et al.
2001/0021635 A1* 9/2001 Akahane ................... 454/142

FOREIGN PATENT DOCUMENTS

JP        2-30323        8/1990

* cited by examiner

Primary Examiner—Steve McAllister
Assistant Examiner—Helena Kosanovic
(74) Attorney, Agent, or Firm—Harness, Dickey & Pierce, PLC (57) ABSTRACT

A cover assembly for an aperture in a wall may include: a first support and a second support provided on the wall, each support including a monolithic receptacle; a first pin-portion and a second pin-portion rotatably mounted in the receptacles, respectively, to define respective pivot-hinge arrangements; and a cover coupled to the first and second pin-portions. For example, the wall may be a part of fluid (e.g., air) duct disposed in a vehicle, and the cover may be oriented with respect to the wall so that the aperture represents one of an inlet and an outlet.

25 Claims, 5 Drawing Sheets

AIR-INLET OPENING/CLOSING UNIT

PRIORITY STATEMENT

This U.S. non-provisional application claims priority on Japanese Patent Application No. 2003-374688 filed on Nov. 4, 2003, the entire disclosure of which is incorporated herein by reference.

BACKGROUND OF THE INVENTION

According to the Background Art, inside/outside air-switching units of an air-conditioner for a vehicle may include an inside/outside air-switching box, which may include an inside air inlet for sucking air from inside a compartment of the vehicle and an outside air inlet for sucking air from outside the compartment, and also may include an inside/outside air-switching door for opening and closing the inside air inlet and the outside air inlet.

Further, the inside/outside air-switching box may include an auxiliary inside air inlet for sucking air from inside the compartment. The auxiliary inside air inlet may be opened and closed by an auxiliary door. Also, the auxiliary door may include an auxiliary rotational shaft and an auxiliary door portion for opening and closing the auxiliary inside air inlet.

Figure 8:
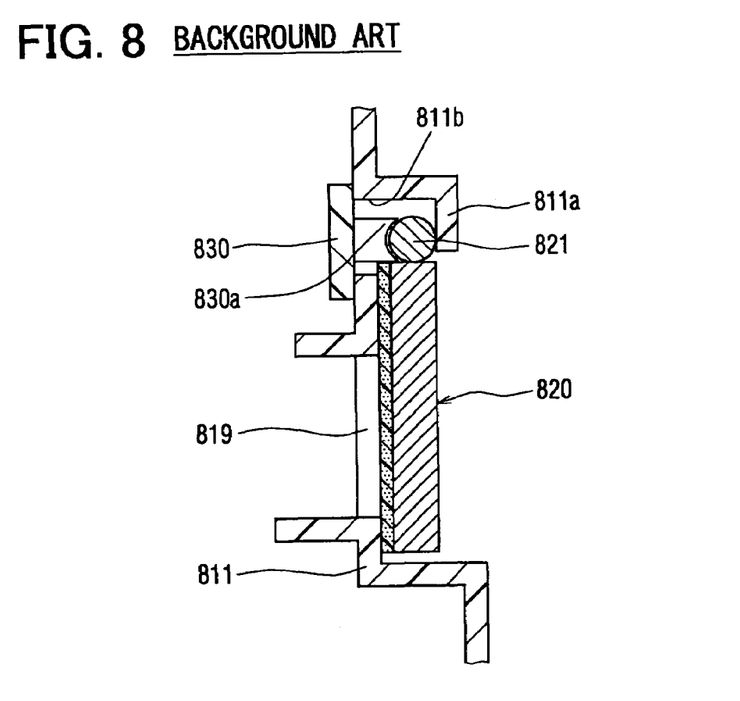
FIG. 8 illustrates a cross section of a part of a blower unit according to the Background Art.

FIG. 8 illustrates an inside/outside air-switching unit according to the Background Art.

In FIG. 8, the auxiliary inside air inlet 819 (disposed in the inside/outside air-switching box 811) may be rendered open and closed by the rotational position of the auxiliary door 820. The cover plate 830 may be fitted into a recess 811b formed by the configuration of recessed portion 811a of the inside/outside air-switching box 811.

The cover plate 830 may have a T-shaped cross-section. The stalk of the T-shape has a distal end 830a that may be concave and complementarily shaped with respect to the circumference of auxiliary rotational shaft 821. The auxiliary rotational shaft 821 may be held in place by being compressed between a recessed portion 811a of the inside/outside air-switching box 811 and the distal end 830a of the cover plate 830.

During operation according to a fresh intake mode, in which the inside/outside air-switching door (not shown) fully be positioned to fully open the outside a air inlet and to fully close the inside air inlet, air inside the compartment is not sucked into the inside/outside air-switching box 811 through the inside air inlet. However, the position of the auxiliary door 820 may be controlled to open the auxiliary inside air inlet 819, and the air inside the compartment may be sucked into the inside/outside air-switching box 811 through the auxiliary inside air inlet 819. As a result, the auxiliary inside air may assist in the heating of the outside air by mixing therewith in the inside/outside air-switching box 811.

SUMMARY OF THE INVENTION

Example embodiments of the present invention may improve characteristics of temperature of air discharged from an air opening.

An example embodiment of the present invention provides a cover assembly for an aperture in a wall. Such a cover assembly may include: a first support and a second support provided on the wall, each support including a monolithic receptacle; a first pin-portion and a second pin-portion rotatably mounted in the receptacles, respectively, to define respective pivot-hinge arrangements; and a cover coupled to the first and second pin-portions. For example, the wall may be a part of fluid (e.g., air) duct disposed in a vehicle, and the cover may be oriented with respect to the wall so that the aperture represents one of an inlet and an outlet.

Additional features and advantages of the present invention will be more fully apparent from the following detailed description of example embodiments, the accompanying drawings and the associated claims.

BRIEF DESCRIPTION OF THE DRAWINGS

The present invention will be more readily apparent from the following detailed description of example embodiments when taken together with the accompanying drawings, in which.

DETAILED DESCRIPTION OF EXAMPLE EMBODIMENTS

Example embodiments of the present invention will be described hereinafter with reference to the accompanying drawings.

In developing the present invention, the following problem with the Background Art was recognized and a path to a solution identified. Since the auxiliary rotational shaft 821 of the Background Art may be held in place by clamp-like compression between the recessed portion 811a and the cover plate 830, the auxiliary rotational shaft 821 may experience undesirably high friction when rotated (or, in other words, may bind when rotated) if it is compressed too tightly therebetween. On the other hand, inadequate compression may inadequately support shaft 821. For example, inadequate compression might introduce an undesirable amount of play into the assembly that could cause, e.g., an incomplete seal to be made between the auxiliary door 820 and the air-switching box 811, awkward rotation of shaft 821, etc. Over-tightening and under-tightening the overlapping peripheral portion of the cover plate 830 against the air-switching box 811 may introduce such variability. Supporting such a rotational shaft 821 by an arrangement that does not variably compress it in a clamp-like manner would reduce such variability. At least one embodiment of the present invention supports such a shaft in a manner that does not exhibit such variable compression.

Figure 1:
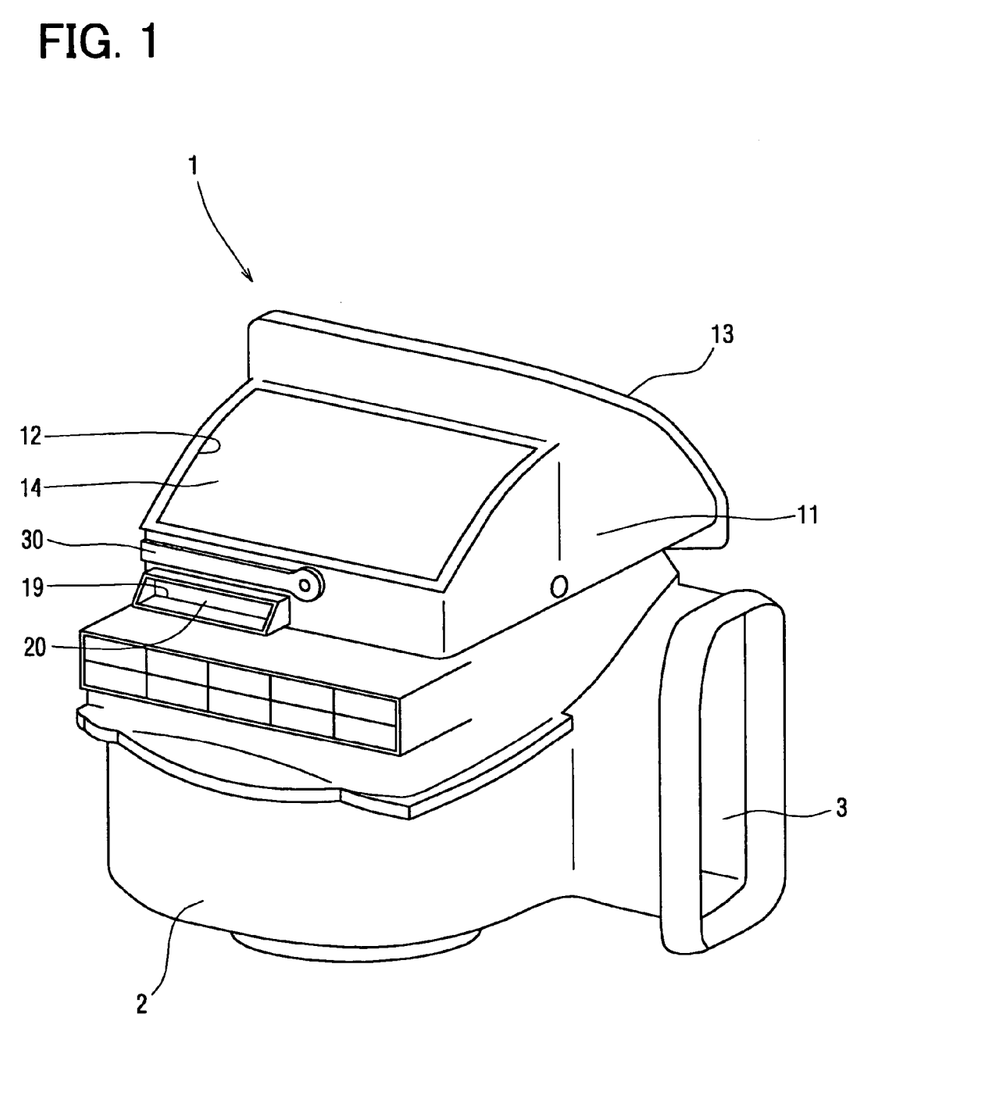
FIG. 1 illustrates a perspective view of a blower unit according to an example embodiment of the present invention.
Figure 2:
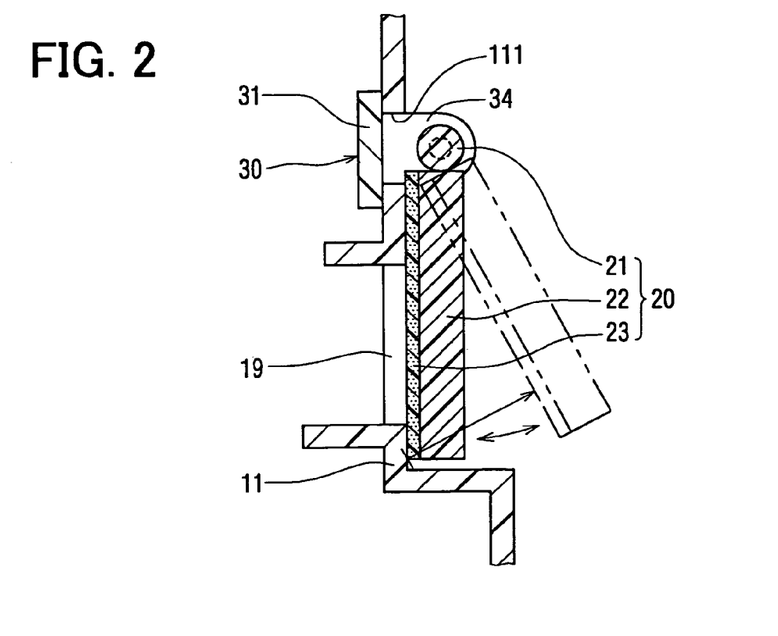
FIG. 2 illustrates a cross section of a part of a blower unit according to an example embodiment of the present invention.

FIG. 1 illustrates a perspective view of a blower unit according to an example embodiment of the present invention;

FIG. 2 illustrates a cross section of a part of a blower unit according to an example embodiment of the present invention;

In FIG. 1, a ventilation system of an air-conditioner unit (not shown) for a vehicle may include a blower unit 1, where the air conditioning unit (not shown) can be disposed downstream from the blower unit 1.

The air-conditioning unit may be disposed substantially at a center portion along a width direction of a vehicle and inside an instrument panel in a compartment, e.g., a passenger compartment, of the vehicle. The blower unit 1 may be also disposed inside the instrument panel, but may be shifted from the air-conditioning unit to a front passenger's seat side in the vehicle's width direction.

The blower unit 1 may include a fan unit (not shown) forming a lower part of the blower unit 1 and an inside/outside air-switching unit (not shown) forming an upper part of the blower unit 1.

The fan unit may include a scroll casing 2 forming a scroll-shaped air path and may include a centrifugal fan (not shown) accommodated in the scroll casing 2. The centrifugal fan may suck air from an axial direction thereof and may discharge air in a radial direction thereof. Air from the centrifugal fan may be discharged toward an air discharge port 3 formed in the scroll casing 2 and then may flow into the air conditioning unit. The centrifugal fan may be rotated by an electric motor.

More particularly in FIG. 1, the inside/outside air-switching unit may include an inside/outside air-switching box 11 made, e.g., of a resin such as polypropylene. The inside/outside air-switching box 11 may include an inside (main) air inlet 12 for sucking air (or, in other words, drawing) from inside a compartment of the vehicle, an outside air inlet 13 for sucking air from outside the compartment, and an auxiliary inside air inlet (or, in other words, aperture) 19 for sucking air from inside the compartment. The auxiliary inside air inlet 19 may be disposed slightly below a lower edge of the inside air inlet 12.

The inside/outside air-switching unit may further include an inside/outside air-switching door (or, in other words, a panel) 14 that may be positioned to open and close the inside air inlet 12 and the outside air inlet 13. The inside/outside air-switching door 14 may include an inside/outside rotational shaft (not shown) and an inside/outside plate member (not shown) connected to the inside/outside rotational shaft. The inside/outside rotational shaft may be supported in the inside/outside air-switching box 11. One end of the inside/outside rotational shaft may be connected to an actuator device with a servomotor through a link mechanism, or one end of the inside/outside rotational shaft may be connected to a manual operation mechanism.

The inside/outside air-switching unit may also include an auxiliary door 20 for opening and closing the auxiliary inside air inlet 19. The auxiliary door 20 may be positioned to open the auxiliary inside air inlet 19 at least when the inside/outside air-switching door 14 may be positioned to fully open the outside air inlet 13 and fully close the inside air inlet 12.

The auxiliary door 20 may be supported with a supporting member 30 as described hereinafter, and the supporting member 30 may be fitted into a hole 111 (shown in FIG. 2) of the inside/outside air-switching box 11 as described hereinafter. FIG. 2 illustrates a cross section of a part of a blower unit according to an example embodiment of the present invention.

Next, a detailed discussion of the structure of the auxiliary door 20 and the supporting member 30 will be described with reference to FIGS. 3A and 3B.

Figure 3A:
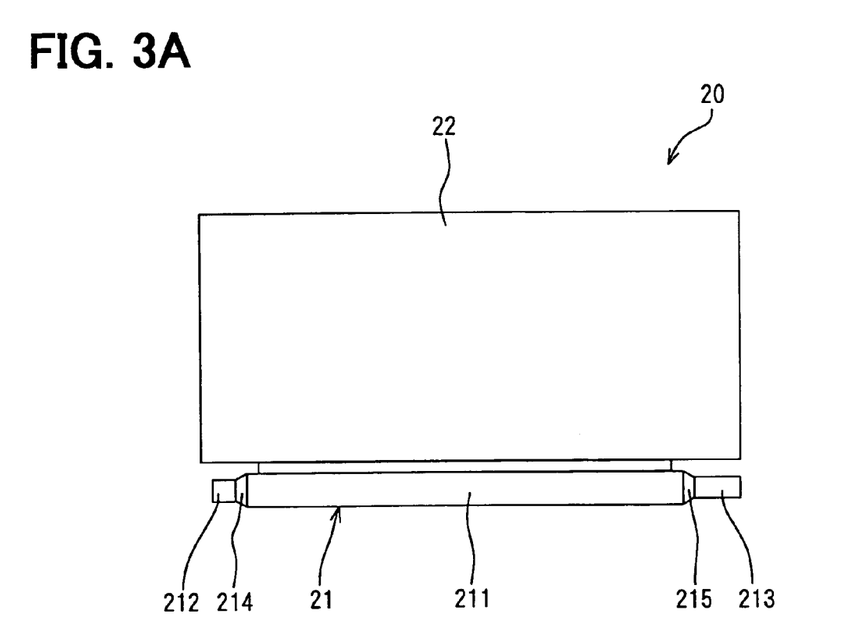
FIG. 3A illustrates a plan view of an auxiliary door according to an example embodiment of the present invention.

FIG. 3A illustrates a plan view of an auxiliary door according to an example embodiment of the present invention. FIG. 3B illustrates a plan view of a supporting member according to an example embodiment of the present invention.

As shown in FIG. 3A, the auxiliary door 20 may include an auxiliary rotational shaft 21, an auxiliary plate member (or, in other words, a cover) 22 formed, e.g., in a rectangular shape and connected to the rotational shaft 21. The auxiliary door 20 may also include a sealing member 23 (shown in FIG. 2), e.g., a gasket, attached to a side of the auxiliary plate member 22 so as to be disposed between it and the box 11. An outline (or, in other words, silhouette) of the auxiliary plate member 22 and an outline of the sealing member 23 may be substantially the same. The outline of the sealing member 23 may respectively exceed an outline of the auxiliary inside air inlet 19 so that the auxiliary plate member 22 may substantially completely block airflow through the auxiliary inside air inlet 19. To phrase this differently, an area of the surface represented by the combined sealing member 23 and the auxiliary plate member 22 may exceed the surface area represented by the auxiliary inside air inlet 19. The auxiliary rotational shaft 21 and the auxiliary plate member 22 may be: made, e.g., of a resin such as polypropylene; and molded so as to produce a unitary structure, if not a monolithic structure. Also, the sealing member 23 may be made, e.g., of a resin such as polyurethane.

The auxiliary rotational shaft 21 may include a larger diameter (or, alternatively, radius) portion 211 (or, in other words, a central segment-shaft), a first smaller diameter portion (or, in other words, first pin-portion) 212, a second smaller diameter portion (second pin-portion) 213, a first taper portion 214, and a second taper portion 215. The larger diameter portion 211 may be formed in a cylindrical shape and may be connected to the auxiliary plate member 22. The first smaller diameter portion 212 may be formed in a cylindrical shape and may be joined to one side of the larger diameter portion 211 by the first taper portion 214. The second smaller diameter portion 213 may be formed in a cylinder shape and may be joined to the other side of the larger diameter potion 211 by the second taper potion 215. The length of the second smaller diameter portion 213 ($L_{213}$) may be longer than that of the first smaller diameter portion 212 ($L_{213}$), namely $L_{213} > L_{212}$.

Figure 3B:
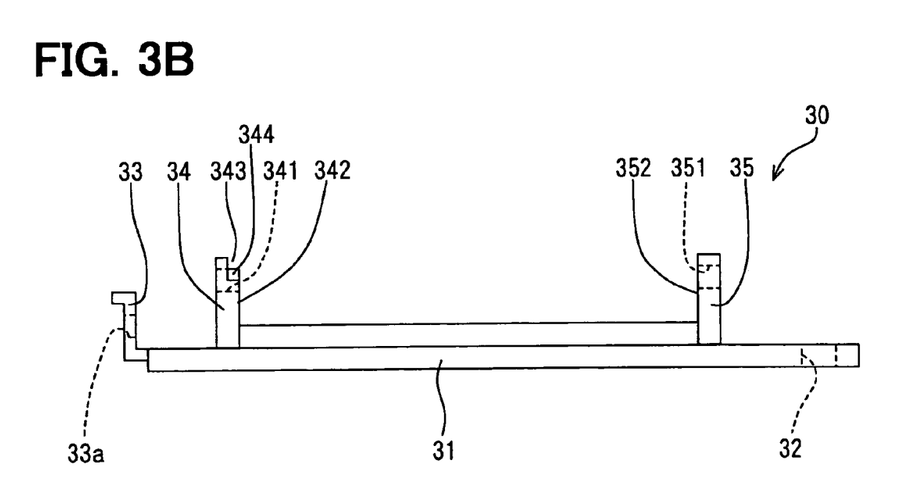
FIG. 3B illustrates a plan view of a supporting member according to an example embodiment of the present invention.

On the other hand, as shown in FIG. 3B, the supporting member 30 may include a plate portion (or, in other words, plate member) 31 having, e.g., a rectangular shape, a first protrusion 34 for supporting the first smaller diameter portion 212, and a second protrusion 35 for supporting the second smaller diameter portion 213.

Each of protrusions 34 & 35 may: include a receptacle to receive the respective first and second smaller diameter portions 212 and 213; and be formed as a monolithic structure. Further, the protrusions 34 & 35 and the plate portion 31 may be: formed, e.g., of a resin such as polypropylene; and formed together as a unitary, or moreover a monolithic, structure that defines a frame. Such a frame may be resilient, namely, capable of withstanding a small amount of bending or flexing (as will discussed in more detail below).

An outline (silhouette) of the plate portion 31 may exceed that of the hole 111 (shown in FIG. 2). As a result, a peripheral portion of the plate member 31 may overlap with the inside/outside air-switching box 11. The plate portion 31 may include one or more through holes 32 in the overlapping portion. The plate member 31 may also include a hook portion 33 at another one of the overlapping portion. The hook portion 33 may be in an L shape and may include a through hole 33a, through which a projection (not shown) disposed in the inside/outside air-switching box 11 may be engaged.

The first protrusion 34 and the second protrusion 35 may respectively be protruded from a surface of the plate portion 31.

The first protrusion 34 may include a first penetration hole 341, e.g., a through hole. The diameter of the first penetration hole 341 may be larger than that of the first smaller diameter portion 212, but smaller than that of the larger diameter portion 211. The second protrusion 35 may include a second penetration hole 351. Diameter of the second penetration hole 351 may be larger than that of the second smaller diameter portion 213, but smaller than that of the larger diameter portion 211.

The length between an inner surface 342 of the first protrusion 34 and the opposing inner surface 352 of the second protrusion 35 may be longer than that of the larger diameter portion 211. As a result, in a state where the auxiliary door 20 may be supported with the supporting member 30, mechanical play may exist between the auxiliary rotational shaft 21 and the protrusion members 34 and 35.

More details of the first protrusion 34 will now be described with reference to FIG. 4, which illustrates a perspective view of a first protrusion of a supporting member according to an example embodiment of the present invention.

Figure 4:
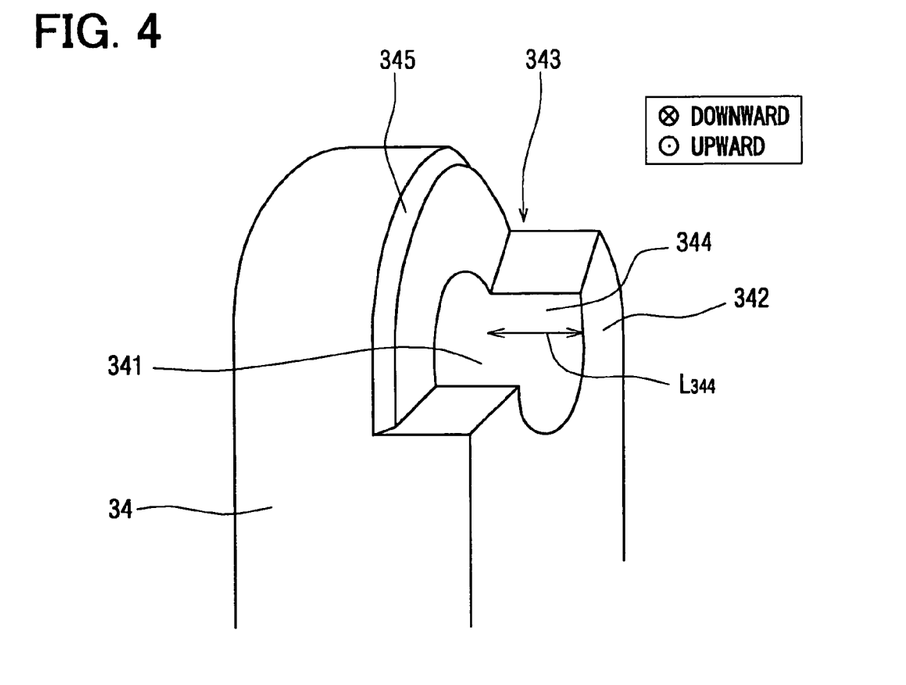
FIG. 4 illustrates a perspective view of a first protrusion of a supporting member according to an example embodiment of the present invention.

It should be noted that FIG. 4 assumes the following: a direction going into the page (denoted by the symbol (x)) is generally downward with respect to vertical; and a direction coming out of the page (denoted by the symbol ⊙) is generally upward with respect to vertical.

In the example of FIG. 4, an annular segment of the first protrusion 34 may be cut out such that a remaining (or, in other words, cut) portion 343 may be formed towards the inner surface 342 (rather than the corresponding outer surface) of the first protrusion 34. The cut portion 343 may include a supporting surface 344 against which may bear the circumferential surface, e.g., of the first smaller diameter portion 212. In cross-section, the supporting surface 343 can be described as an arc segment, e.g., lesser in size than a whole circle but greater than a half-circle. As a result, in a state where the auxiliary door 20 may be supported with the supporting member 30, the arc-segment represented by supporting surface 343 extends sufficiently underneath (recall the assumptions in FIG. 4) the first smaller diameter portion 212 to uphold it in opposition to one or more effects of gravity.

The length of the first smaller diameter portion 212 may be slightly longer than that of the cut portion 343, namely L344. Therefore, in a circumstance where at first the second smaller diameter portion 213 may be inserted into the second hole 351, subsequently the first smaller diameter portion 212 may be inserted into the first hole 341 by temporarily and slightly deflecting a distal end of the first protrusion 34 relative to where the proximal end thereof is attached to the plate portion, (or, in other words, by temporarily and slightly deforming the frame of which the first protrusion 34 is a component). The requisite amount of deflection may be reduced by optionally forming a beveled surface 345 on the first protrusion 34.

On the other hand, the length of the second smaller diameter portion 213 may be significantly longer than that of the cut portion 343. That is, the length of the second smaller diameter portion 213 may be significantly longer than that of the supporting surface 344. Therefore, in a circumstance where at first the first smaller diameter portion 212 may have been inserted into the second hole 351, the second smaller diameter portion 213 subsequently may not be inserted into the first hole 341 despite a normal amount of outward deflection having been induced upon the first protrusion 34a.

Next, a method for engaging the auxiliary door 20 with the inside/outside air-switching box 11 will be described.

Figure 5:
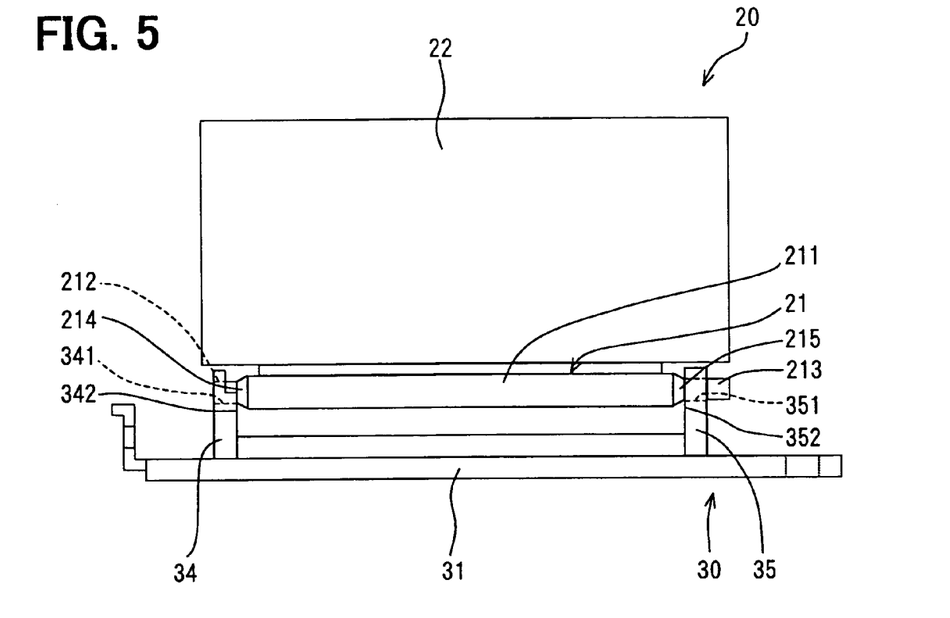
FIG. 5 illustrates a plan view of an assembly including an auxiliary door and a supporting member according to an example embodiment of the present invention.

First, the second smaller diameter portion 213 may be inserted into the second penetration hole 352. Then, after temporarily and slightly deflecting the first protrusion 34 outward, the first smaller diameter portion 212 may be inserted into the first penetration hole 341. FIG. 5 shows an orientation state of the door 20 with respect to the supporting member 30 after the first smaller diameter portion 212 has been inserted into the first penetration hole 341, according to at least one embodiment of the present invention.

Figure 6:
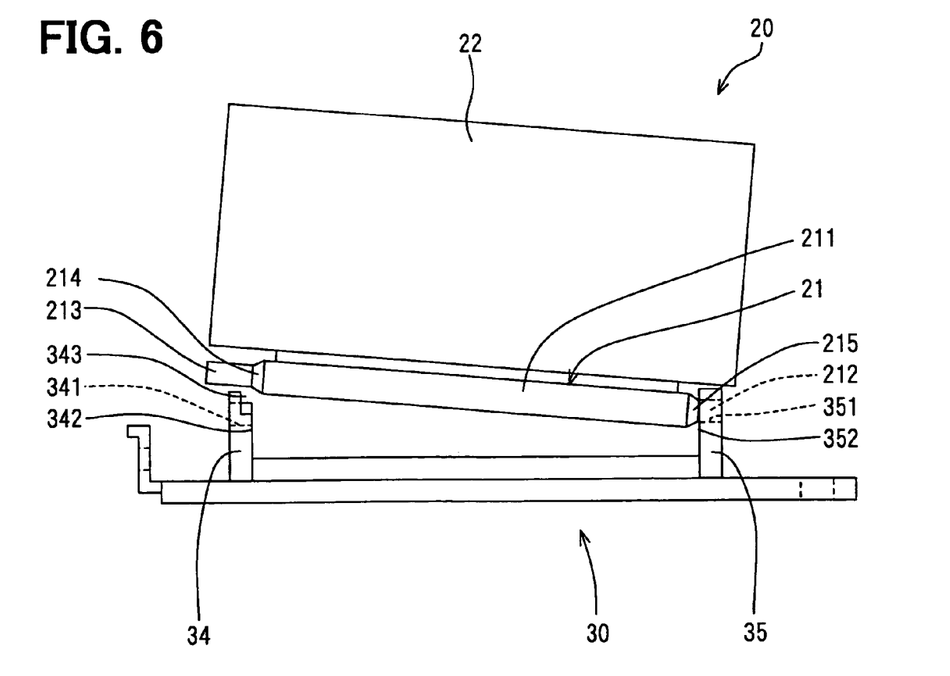
FIG. 6 illustrates the assembly of FIG. 5 albeit in an orientation state that precedes the orientation state of FIG. 5, according to at least one embodiment of the present invention.

Correspondingly, FIG. 6 illustrates the assembly of FIG. 5 albeit in an orientation state that precedes the orientation state of FIG. 5, according to at least one embodiment of the present invention.

In FIG. 6, if the first smaller diameter portion 212 is inserted into the second penetration hole 351 first, then the second smaller diameter portion 213 may not be inserted into the first penetration hole 341 despite a normal amount of outward deflection having been induced upon the first protrusion 34a.

Consequently, the asymmetric lengths of the smaller diameter portions 212 & 213 and the depths of the holes 341 & 351 together exhibit a benefit of at least promoting, if not substantially ensuring, achievement of a desired orientation of the auxiliary door 20 with respect to the auxiliary air inlet 19. More particularly, the desired orientation may have the sealing member 23 facing the auxiliary inside air inlet 19.

An assembly the includes the auxiliary door 20 and the supporting member 30 shown in FIG. 5 advantageously may be inserted into the inside/outside air-switching box 11 through the hole 111, and the peripheral portion of the plate portion 31 may abut the edge of the inside/outside air-switching box 11.

The penetration hole 33a of the hook portion 33 may be engaged with the projection (not shown but described above) disposed in the inside/outside air-switching box 11, and then, the peripheral portion of the other end of the plate portion 31 may be connected to the inside/outside air-switching box 11 by a fastening member such as a screw (not shown) through the screw hole 32.

Next, operation of the blower unit 1 is explained.

During a fresh intake mode, the inside/outside air-switching door 14 may be positioned to fully open the outside air inlet 13 and fully close the inside air inlet. As such, rotation of the centrifugal fan of the fan unit then may suck air outside the compartment into the inside/outside air-switching box 11 through the outside air inlet 13.

Suction induced by the centrifugal fan upon the inside/outside air-switching box 11 may cause negative air pressure in the inside/outside air-switching box 11 with respect to the compartment (a pressure gradient). As a result, the air pressure inside the inside/outside air-switching box 11 may be lower than the air pressure outside the inside/outside air-switching box 11. The air pressure difference may cause the auxiliary door 20 to be moved (by air being drawn from the compartment) from the position shown by a solid line in FIG. 2 to the position shown by a chain-double-dashed line in FIG. 2. Air inside the compartment that is sucked into the inside/outside air-switching box 11 through the auxiliary inside air inlet 19 and which is then mixed with the outside air may assist in the heating effect of the vehicle compartment.

On the other hand, during a recirculation intake mode, in which the inside/outside air-switching door 14 may be positioned to fully close the outside air inlet 13 and fully open the inside air inlet 12, rotation of the centrifugal fan may suck air inside the compartment into the inside/outside air-switching box 11 through the inside air inlet 12.

Such suction by the centrifugal fan may cause negative air pressure in the inside/outside air-switching box 11, and (in a manner similar to the recirculation intake mode) an air pressure gradient may move the auxiliary door 20 from the position shown by the solid line in FIG. 2 to the position shown by the chain-double-dashed line in FIG. 2.

According to the embodiments discussed above, the auxiliary rotational shaft 21 may be supported with the supporting member 30, and this supporting member 30 may be fitted with the inside/outside air-switching box 11. In other words, the auxiliary door 30 does not directly contact a surface of the inside/outside air-switching box 11 directly in order to derive support.

Therefore, even if the supporting member 30 is over-tightened or under-tightened against the inside/outside air-switching box 11, the rotational coupling between the auxiliary door 20 and the supporting member 30 is not substantially effected. Consequently, the problem described above with regarding Background Art FIG. 8 may be solved.

Figure 7:
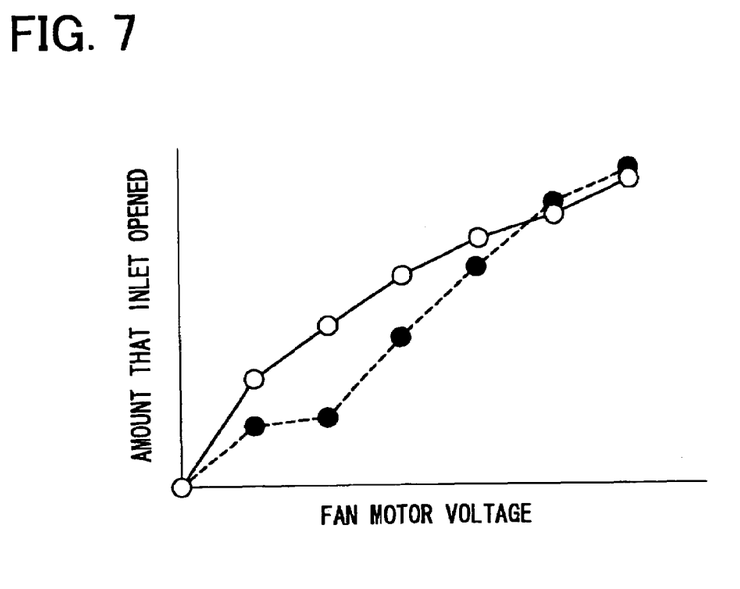
FIG. 7 illustrates a characteristic of an opening degree of an auxiliary door with respect to a voltage impressed to an electric motor of a centrifugal fan.

FIG. 7 is a graph that plots (on the Y-axis) a distance that a lower edge of the auxiliary door 20 is moved away from the corresponding lower edge of the auxiliary inside air inlet 19 (a measure of the degree to which the auxiliary inside air inlet is open) versus (as plotted on the X-axis) a voltage impressed upon the electric motor (not shown) of the centrifugal fan. Results for an example implementation of an example embodiment of the present invention are indicated with a the solid line, while results of a comparable unit according to the Background Art are indicated with a broken line. Inspection of FIG. 7 reveals that the performance of the example present implementation may be more linear than that of the Background Art.

In the example embodiment described above, the auxiliary inside air inlet 19 has been described as having a rectangular shape. Alternatively, other shapes for the auxiliary inside air inlet 19 may be used. Similarly, non-rectangular shapes may be used for the auxiliary door 20.

In the example embodiments described above, the auxiliary inside air inlet 19 has been described as being disposed at the inside/outside air-switching box 11. Alternatively, the auxiliary inside air inlet 19 may be disposed at other locations, e.g., at the inside/outside air-switching door 14, at an outside air duct (not shown) connected to the outside air inlet 14, etc.

In the example embodiments described above, the air pressure difference has been described as the mechanism by which the auxiliary door 20 is moved. Alternatively, e.g., the auxiliary door 20 may be moved by a driving device such as an electric motor. In that circumstance, a controlling device may control the driving device to move the auxiliary door 20 an so open the auxiliary inside air inlet 19, e.g., always during the fresh intake mode, during the fresh intake but only when an outside air temperature is below a reference temperature, etc.

In the example embodiments described above, the cut portion 343 has been described as being disposed at the first protrusion 34. Alternatively, the cut portion 343 may be disposed at the second protrusion 35 instead of at the first protrusion 35. Also in the alternative, the cut portion 343 may be disposed at both the first protrusion 34 and the second protrusion 35.

Such variations are not to be regarded as departure from the spirit and scope of the example embodiments of the present invention, and all such modifications as would be obvious to one skilled in the art are intended to be included within the scope of the following claims.

What is claimed is:

1. A cover assembly for an aperture in a wall, the assembly comprising:
   a monolithic first support and a monolithic second support provided on the wall, each support including a monolithic receptacle;
   a first pin-portion and a second pin-portion wholly supported and rotatably mounted in the receptacles, respectively, to define respective pivot-hinge arrangements;
   a cover coupled to the first and second pin-portions;
   a central-segment-shaft disposed between the first pin-portion and the second pin portion, the central segment-shaft being connected to the cover;
   a length of the first pin-portion is smaller than a length of the second pin-portion; and
   the first support has a cut-out portion provided in the receptacle in a circumferential direction of the receptacle; wherein
   the first pin-portion is assembled to the first monolithic support in a radial direction of the first pin-portion.

2. The assembly of claim 1, further comprising:
   a member that connects the first support to the second support;
   wherein the member and first and second supports are of monolithic construction that defines a frame.

3. The assembly of claim 2,
   wherein the first and second pin-portions are substantially cylindrical;
   wherein the central-segment-shaft has a larger radius than each of the first and second pin-portions, the central-segment-shaft radius being greater than can fit in the receptacle;
   wherein a spacing between the first and second supports is sized to accommodate a length of the central-segment-shaft when the first and second pin-portions are inserted into the receptacles, respectively; and
   wherein the frame is resilient such that insertion of the pin-portions into the receptacles is accomplished by deformation of the frame.

4. The assembly of claim 3, wherein:
   an amount of normal deformation of the frame is sufficient to accommodate insertion of the first pin-portion into one of the receptacles after insertion of the second pin-portion into the other one of the receptacles, but is insufficient to accommodate insertion of the second pin-portion after insertion of the first pin-portion.

5. The assembly of claim 4, wherein:
   the receptacle of the first support includes a first portion and a second portion defined by the cut-out portion;
   a first cross-section of a surface of the first portion against which bears a circumference of a given one of the first and second pin-portions is circular;
   a second cross-section of a surface of the second portion, against which bears the circumferential surface of the given pin-portion, is an arc segment of a circle;
   a thickness of the second portion, in combination with the normal deflection of the frame, is sufficient to accommodate insertion of the first pin-portion after insertion of the second pin-portion, but is insufficient to accommodate insertion of the second pin-portion after insertion of the first pin-portion.

6. The assembly of claim 1, wherein:
   the receptacle of the first support includes a first part and a second part defined by the cut-out portion;

a first cross-section of a surface of the first part against which bears a circumference of a given one of the first and second pin-portions is circular; and a second cross-section of a surface of the second part against which bears the circumference of one of the given pin-portion is an arc segment of a circle.

7. The assembly of claim 6, wherein the arc segment is oriented so as to uphold the given pin-portion in opposition to one or more effects of gravity.

8. The assembly of claim 1, wherein the cover and the first and second pin-portions are combined in a monolithic construction.

9. The assembly of claim 1, wherein:
the wall is a part of a fluid duct; and
the cover is oriented with respect to the wall so that the aperture represents one of an inlet and an outlet for the fluid.

10. The assembly of claim 9, wherein the duct is disposed in a vehicle.

11. The assembly of claim 10, wherein:
the aperture represents an air inlet; and
the air inlet is auxiliary to a main air inlet.

12. The assembly of claim 10, wherein:
the duct further includes
an outside air inlet,
an inside air inlet, and
a panel movably mounted so as to selectably cover one of
the outside air inlet when air is drawn through the inside air inlet, and
the inside air inlet when air is drawn through the outside air inlet;
the cover is disposed so that the aperture represents a supplemental inside air inlet.

13. The assembly of claim 1, wherein:
an area of the surface of the cover facing the aperture is greater than an area of the aperture.

14. The assembly of claim 1, wherein the first and second pin-portions represent opposite ends of a structure having at least unitary construction.

15. An air inlet opening/closing unit comprising:
an air path structure including an air inlet;
an air inlet opening/closing device positionable to open and close the air inlet, the air inlet opening/closing device including a rotational shaft and a door portion; and
a shaft supporting member for rotatably supporting the rotational shaft, the shaft supporting member including
a fixing portion,
a first monolithic protrusion protruding from the fixing portion, and
a second monolithic protrusion protruding from the fixing portion;
the first protrusion defining a first hole, a first end of the rotational shaft being insertable into the first hole the first end of the rotational shaft being wholly supported by the first monolithic protrusion;
the second protrusion defining a second hole, a second end of the rotational shaft being inserted into the second hole the second end of the rotational shaft being wholly supported by the second monolithic protrusion;
a central-segment-shaft disposed between the first end and the second end of the rotational shaft, the central-segment-shaft being directly connected to the door portion;
a length of the first end of the rotational shaft is smaller than a length of the second end of the rotational shaft; and the first protrusion has a cut-out portion provided around a portion of the first hole in a circumferential direction of the first hole; wherein
the first end of the rotational shaft is assembled to the first monolithic protrusion in a radial direction of the first end of the rotational shaft.

16. The air inlet opening/closing unit according to claim 15, wherein the central-segment-shaft has a diameter larger than a diameter of at least one of the first hole and the second hole.

17. The air inlet opening/closing unit according to claim 16, wherein:
the central-segment-shaft is disposed between the first protrusion and the second protrusion;
the first end of the rotational shaft includes a first smaller diameter portion;
the second end of the rotational shaft includes a second smaller diameter portion;
the first smaller diameter portion is inserted into the first hole; and
the second smaller diameter portion is inserted into the second hole.

18. An inside/outside air-switching unit for an air-conditioner disposed in a vehicle, the inside/outside air-switching unit comprising:
an air path structure including a main inside air inlet for drawing air from inside a compartment of the vehicle, an outside air inlet for drawing air from outside the compartment, and an auxiliary inside air inlet for drawing an auxiliary amount of air from inside a compartment of the vehicle;
an inside/outside air-switching device for opening and closing the inside air inlet and the outside air inlet;
an auxiliary air inlet opening/closing device positionable to open and close the auxiliary air inlet, the auxiliary air inlet opening/closing device including a rotational shaft and a door portion; and
a shaft supporting member for rotatably supporting the rotational shaft, the shaft supporting member including
a fixing portion,
a first monolithic protrusion protruding from the fixing portion, and
a second monolithic protrusion protruding from the fixing portion;
the first protrusion defining a first hole, a first end of the rotational shaft being insertable into the first hole the first end of the rotational shaft being a wholly supported by the first monolithic protrusion;
the second protrusion defining a second hole, a second end of the rotational shaft being inserted into the second hole the second end of the rotational shaft being wholly supported by the second monolithic protrusion;
a central-segment-shaft disposed between the first end and the second end of the rotational shaft, the central-segment-shaft being directly connected to the door portion;
a length of the first end of the rotational shaft is smaller than a length of the second end of the rotational shaft; and
the first protrusion has a cut-out portion provided around a portion of the first hole in a circumferential direction of the first hole; wherein
the first end of the rotational shaft is assembled to the first monolithic protrusion in a radial direction of the first end of the rotational shaft.

19. The air inlet opening/closing unit according to claim 1, wherein the first and second supports extend through the wall of the cover assembly.

20. The air inlet opening/closing unit according to claim 15, wherein the first and second protruding portions extend through a wall of the air path structure.

21. The air inlet opening/closing unit according to claim 2, wherein the member is disposed on one side of the wall and the receptacles are disposed on a second side of the wall.

22. The air inlet opening/closing unit according to claim 15, wherein the fixing portion is disposed on one side of a wall of the air path structure and the first and second holes are disposed on a second side of the wall of the air path structure.

23. The air inlet opening/closing unit according to claim 18, wherein the fixing portion is disposed on one side of a wall of the air path structure and the first and second holes are disposed on a second side of the wall of the air path structure.

24. The air inlet opening/closing unit according to claim 15, wherein the first end of the rotational shaft slidingly engages the first protrusion and the second end of the rotational shaft slidingly engages the second protrusion.

25. The air inlet opening/closing unit according to claim 18, wherein the first end of the rotational shaft slidingly engages the first protrusion and the second end of the rotational shaft slidingly engages the second protrusion.

* * * * *

UNITED STATES PATENT AND TRADEMARK OFFICE
CERTIFICATE OF CORRECTION

PATENT NO. : 7,628,687 B2 Page 1 of 1
APPLICATION NO. : 10/980527
DATED : December 8, 2009
INVENTOR(S) : Nitta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1404 days.

Signed and Sealed this

Second Day of November, 2010

David J. Kappos
*Director of the United States Patent and Trademark Office*